United States Patent [19]

Ratke et al.

[11] Patent Number: 5,027,931
[45] Date of Patent: Jul. 2, 1991

[54] BRAKE/SHIFT INTERLOCK FOR AN AUTOMATIC TRANSMISSION SHIFT CONTROL MECHANISM

[75] Inventors: Richard Ratke, Dearborn; Jonathan Dahlstrom, Highland; Donald E. Ellison, Mount Clemens, all of Mich.

[73] Assignee: United Technologies Automotive, Inc., Dearborn, Mich.

[21] Appl. No.: 467,097

[22] Filed: Jan. 18, 1990

[51] Int. Cl.⁵ .................... B60K 41/26; G05G 5/10
[52] U.S. Cl. ..................................... 192/9; 192/4 A; 74/483 R
[58] Field of Search ............. 192/9, 4 A; 74/483 R, 74/483 K

[56] References Cited

U.S. PATENT DOCUMENTS

| | | | |
|---|---|---|---|
| 3,942,614 | 3/1976 | Thompson | 192/4 A |
| 4,096,930 | 6/1978 | Viscardi | 192/4 A |
| 4,473,141 | 9/1984 | Mochida | 192/1 |
| 4,884,668 | 12/1989 | Kobayashi et al. | 192/4 A |
| 4,905,802 | 3/1990 | Gotoh | 74/483 R X |
| 4,934,496 | 6/1990 | Barske et al. | 192/4 A |

Primary Examiner—Allan D. Herrmann
Assistant Examiner—Andrea Pitts
Attorney, Agent, or Firm—Ronald G. Cummings

[57] ABSTRACT

A brake/shift interlock assembly is mounted on the steering column in operational cooperation with a column mounted shift control mechanism for an automatic transmission. The brake/shift interlock assembly includes a pivotal latch for selectively locking the detent bar of the shift control mechanism in the park position, a solenoid assembly with an actuator rod for magnetically holding the latch in the locking position, a return spring for normally biasing the actuator rod and latch in the locking position, a spring lever for selectively moving the latch to an unlock position and an electrical control circuit for energizing the solenoid when the ignition system is on and the foot brake switch is open.

18 Claims, 2 Drawing Sheets

BRAKE/SHIFT INTERLOCK FOR AN AUTOMATIC TRANSMISSION SHIFT CONTROL MECHANISM

BACKGROUND AND SUMMARY OF THE INVENTION

This invention relates to the shift control mechanism for an automatic transmission and more particularly to a brake/shift interlock for the shift control mechanism of an automatic transmission in a vehicle such as an automobile or the like.

In vehicles such as automobiles, it is common to employ an automatic transmission. The transmission is capable of being placed in either a Park mode or various non-Park modes by manual actuation of a shift control mechanism. The non-Park modes typically include Reverse, Neutral, Drive, Second and First. The shift control mechanism typically includes a shift lever which is either floor mounted or column mounted on the steering column. Generally, in such shift control mechanisms, there is provided a detent mechanism which interacts with the shift lever to aid in maintaining the lever in a selected position associated with a selected transmission mode.

Recently, a concern has developed regarding a condition termed "sudden acceleration" in which the vehicle may lurch forward or backward when the gear shift lever is moved from Park to one of the non-Park positions such as Reverse or Drive. One technique for minimizing or preventing problem acceleration is to require that the brakes be applied while shifting out of the Park position. While this may normally be good operating practice, it is preferable to provide a interlock which effectively requires that response.

One such brake/shift interlock requires, in addition to the existing shift control mechanism, having a key-actuated interlock cam, or Park/Lock member, (hereinafter P/L member), a further brake interlock cam for blocking the P/L member, a solenoid having a plunger and rigid arm extensible to actuate the brake interlock cam into actuating engagement with the P/L member when the ignition switch is in the Run position and being deactivated when the vehicle's brake is actuated, and a switch for detecting when the shift control mechanism is in the Park position in order to inhibit operation of the solenoid during brake actuation when other than in Park so as to prevent the noise and wear associated with its actuation.

Another such brake/shift interlock is shown in the commonly owned U.S. Patent Application of Ratke et al entitled Brake/Shift Interlock for an Automatic Transmission Shift Control Mechanism, U.S. Pat. Ser. No. 206,255 filed June 13, 1988, which is incorporated herein by reference in its entirety.

It is an object of the present invention to provide an improved brake/shift interlock for preventing undesirable vehicle acceleration when shifting an automatic transmission from the Park position.

Another object of the invention is to provide such a brake/shift interlock which does not generate undesirable actuation noise in operation.

A further object of the invention is to provide a brake/shift interlock having particular utility with column mounted shift control mechanisms. Included in this objective is the provision of an interlock mechanism which is compact and readily mounted to a steering column.

A further object of the invention is to provide such a brake/shift interlock which is cost effective and does not utilize a park position detection switch.

Accordingly, it has been found that the foregoing and related objects are attained in a brake/shift interlock for use with a vehicle transmission shift control mechanism of the type having a column mounted shift lever for selection of transmission modes and a detent mechanism having a detent member and a cooperating insert plate. The detent member is operationally engageable with the insert plate at a plurality of operating positions corresponding to shift lever position (including a park mode position) for retaining the shift lever in selected transmission mode positions. The brake/shift interlock assembly includes a latch for locking the detent member and interconnected shift lever in the park position. The latch is movably mounted for movement between a locking position for locking the detent member in the park position and an unlock position allowing withdrawal of the detent member from the insert plate. An electromagnetic actuator is configured for maintaining the latch in the locking position. The electromagnetic actuator has an actuator rod moveable between first and second positions with the first position being an energized position. The actuator rod is interconnected to the latch so as to position the latch in the locking position when the rod is in the first position. A biasing spring is connected to the actuator rod for normally biasing the rod to the first position to normally bias the latch in the locking position. An electrical control circuit is adapted for interconnection to the ignition switch circuit and brake switch circuit of a vehicle and is configured for selectively energizing the electromagnetic actuator to hold the rod in the first position and thus hold the latch in the locking position when the ignition switch is closed and the brake switch is open. The electromagnetic actuator is de-energized when the ignition switch is open or the brake switch is closed. A spring lever is interconnected to the latch for moving the latch to the unlocked position when the electromagnetic actuator is de-energized and the detent member is being withdrawn from the park position.

The actuator rod is normally biased by the biasing spring so as to normally retain the latch in its locking position. Thus, energizing the electromagnetic actuator does not produce movement of the actuator rod since it is already biased in the locking position. Rather, energizing the electromagnetic actuator serves to magnetically hold the rod in this position and thereby hold the latch in the locking position to lock the detent member and shift lock in the park position. Accordingly, no mechanical movement of the actuator rod or latch is produced by energizing the electromagnetic actuator and no accompanying actuating noise is produced. Further, no actuating noise is generated by brake operation when the transmission is in an operating position other than park.

DESCRIPTION OF THE PREFERRED EMBODIMENT

Figure 1:
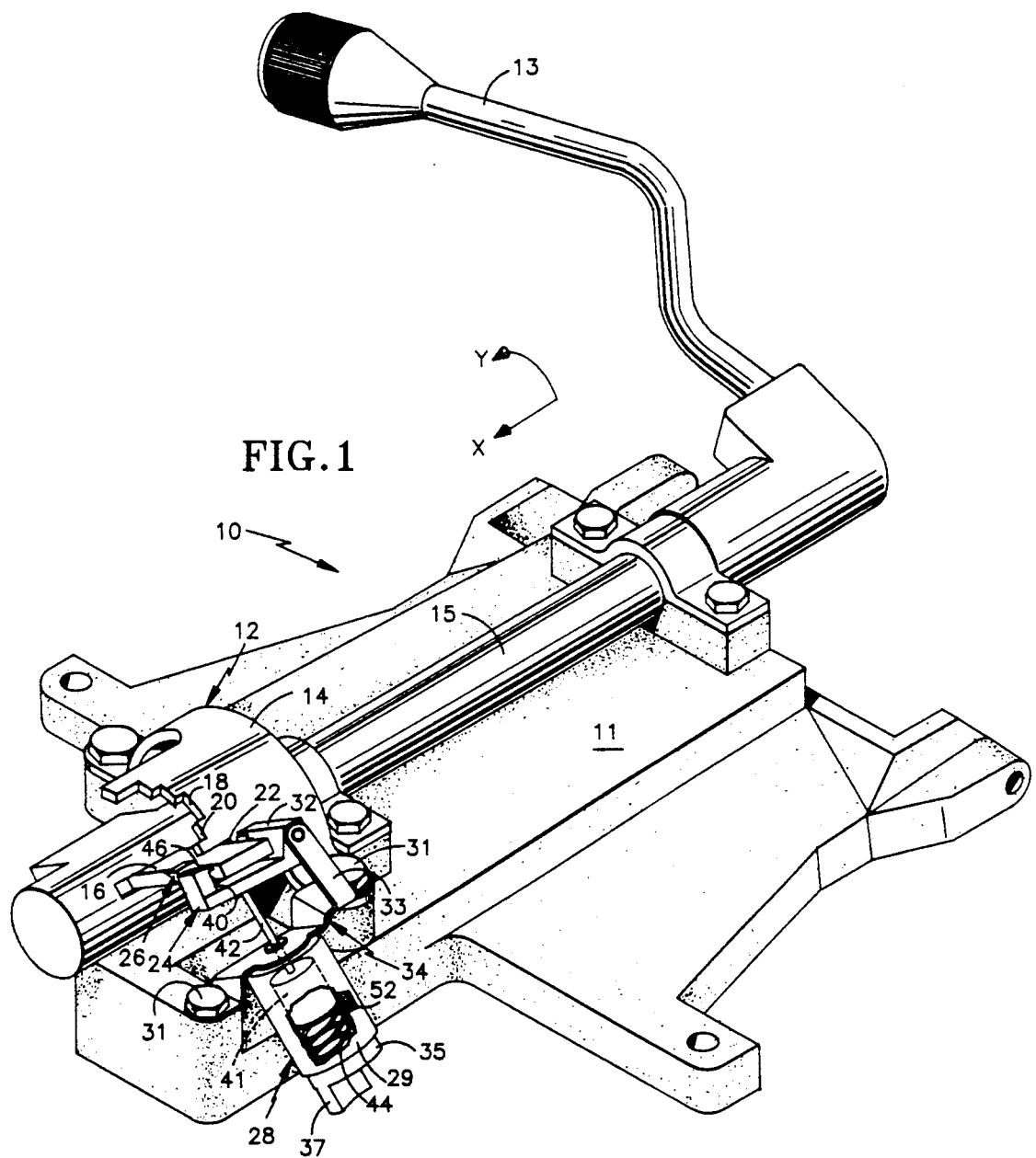
FIG. 1 is a partly broken away perspective view of the brake/shift interlock of the present invention mounted to a steering column shift control mechanism with the shift control mechanism in the park mode position and the brake/shift interlock in the normal at rest "ready" position.

Although specific forms of the present invention have been selected for illustration in the drawings, and the following description is drawn in specific terms for the purpose of describing these forms of the invention, the description is not intended to limit the scope of the invention which is defined in the appended claims.

Referring initially to FIG. 1, the brake/shift interlock of the present invention is shown in assembly with a column mounted shift control mechanism for an automatic transmission (not shown). The shift control mechanism is generally designated by the numeral 10 and is mounted to a steering column 11.

The shift control 10 is shown in FIG. 1 in a "Park" transmission mode position and comprises a manually actuable shift lever 13 connected through a rotatable shift rod 15 to a detent mechanism generally designated by the numeral 12. The detent mechanism 12 serves to aid in maintaining the shift lever in the selected position associated with the desired transmission mode.

The detent mechanism 12 comprises an arcuate insert plate 14, a cooperating detent member in the form of a lever or bar 16, and a retaining spring (not shown) for retaining or biasing the bar 16 in engagement with the plate 14. The plate 14 has a plurality of stepped cutouts, as for example, cutouts 18, 20, 22, configured to receive the bar 16. Each cutout corresponds to a separate selectable transmission mode with cutout 22 being the "park" transmission mode. The bar 16 is directly linked to the shift lever 13 for corresponding movement axially (e.g., in the X direction) and angularly (e.g., in the Y direction) to position the bar 16 in the cutout corresponding to the selected transmission mode. The retaining spring (not shown) retains the bar 16 in the corresponding cutout to maintain the shift lever in the manually selected position corresponding to the desired transmission mode. The detent mechanism and shift lever configuration are convention and need not be described in further detail for purposes of the present invention.

The brake/shift interlock of the present invention generally comprises a latch 24, a spring lever 26, an electromagnetic actuator in the form of solenoid assembly 28, a solenoid control circuit 30, a housing 29 and a bracket assembly 34.

The housing 29 is generally cylindrical in shape and houses the solenoid 28 and the control circuit 30. The control circuit 30 is mounted within the lower end of the housing 29 and enclosed by a housing end cap 35. The end cap 35 forms an elongated electrical connector receptacle 37 for connection of the electrical circuit 30 to the vehicle electrical system. The bracket assembly 34 is fixed to the upper end of the housing 29 and is securely mounted to the column 11 adjacent the detent mechanism 12 by threaded fasteners 31 or the like.

Figure 1A:
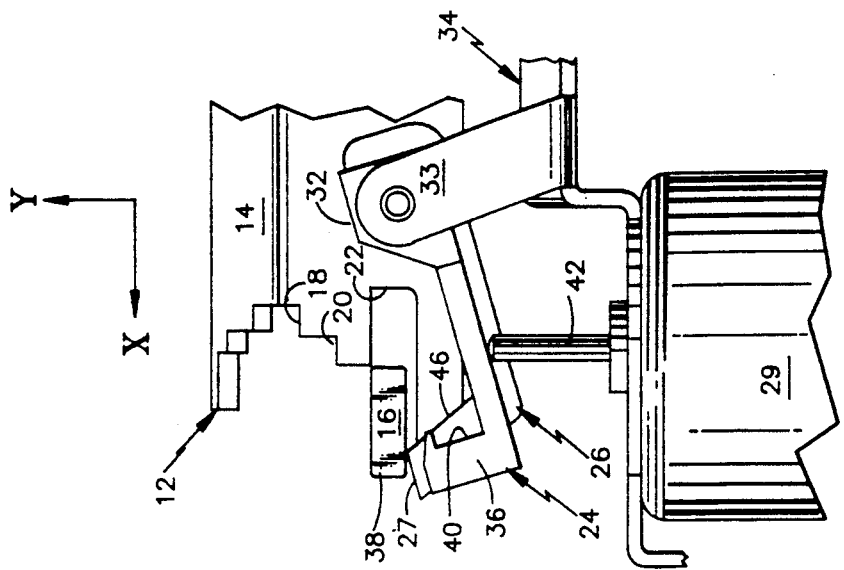
FIG. 1A is a partly broken away enlarged side view of the brake/shift interlock of FIG. 1 in the normal ready position.

Referring to FIG. 1A, the latch 24 is an elongated lever-type member pivotally mounted at one end 32 to the tab 33 of the bracket assembly 34. The distal end 36 of latch 24 is configured to abut bar 16 to stop its axial movement out of the cutout 22. The exterior end 38 of bar 16 is generally rectangular in cross section so the distal end 36 of the latch 24 has a corresponding shallow rectangular cutout 40 configured to catch the exterior end 38 and restrain bar 16 from further movement in the X direction.

Figure 3:
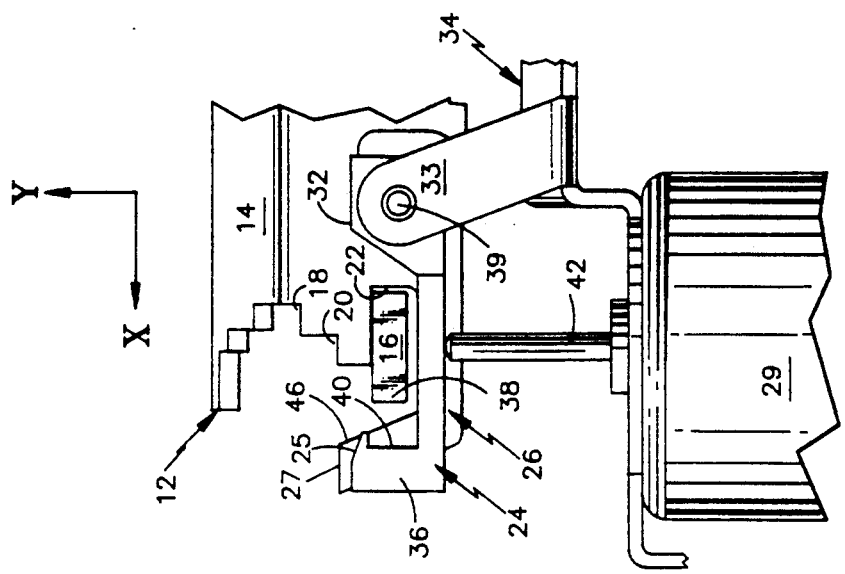
FIG. 3 is a view similar to FIG. 1A with the brake/shift interlock in an "unlocked" position permitting movement of the shift lever out of the park mode.

The latch 24 is mounted to tab 33 for pivotal movement about a pivot axis 39 between a first "ready" or "locking" position as shown in FIG. 1A and a second "unlocked" position as shown in FIG. 3. As will be explained subsequently, in the locking position, the latch 24 is positioned and ready to catch the bar 16 if certain system conditions are then met. In the locking position, cutout 40 of latch 24 faces the cutout 22 of plate 14 and will be in spaced disposition from the end 38 of bar 16 when bar 16 is in the park mode position.

As best seen in FIG. 1, the electromagnetic actuator 28 is a solenoid assembly having a plunger 41 and integrally connected actuator rod 42 moveable between an extended and retracted position. The solenoid 28 is a push-type solenoid so that the actuator rod 42 is extended when the solenoid coil 52 is energized.

A return or biasing spring 44 functions to normally bias the latch 24 in its locking position (FIG. 1) via the actuator rod 42. The helical compression spring 44 is mounted in the lower end of housing 29 in engagement with the lower end of plunger 41 to normally bias the actuator rod in the extended position with a predetermined spring force. The rounded distal end of the actuator rod 42 engages the latch 24 so that biasing spring 44 thus normally biases the latch 24 in its locking position.

The spring lever 26 functions to pivot the latch 24 to the unlock position (FIG. 3) when the solenoid is de-energized to permit either (a) withdrawal of the bar 16 from the park position cutout 22 or (b) introduction of the bar 16 into the park position cutout 22. The spring lever 26 is mounted to tab 33 for pivotal movement coaxially with latch 24 about pivot axis 39. Spring lever 26 is coupled to the end 32 of latch 24 by a radial key interlock (not shown) for pivotal movement in unison between the locking position (FIG. 1A) and the unlocked position (FIG. 3).

Figure 2:
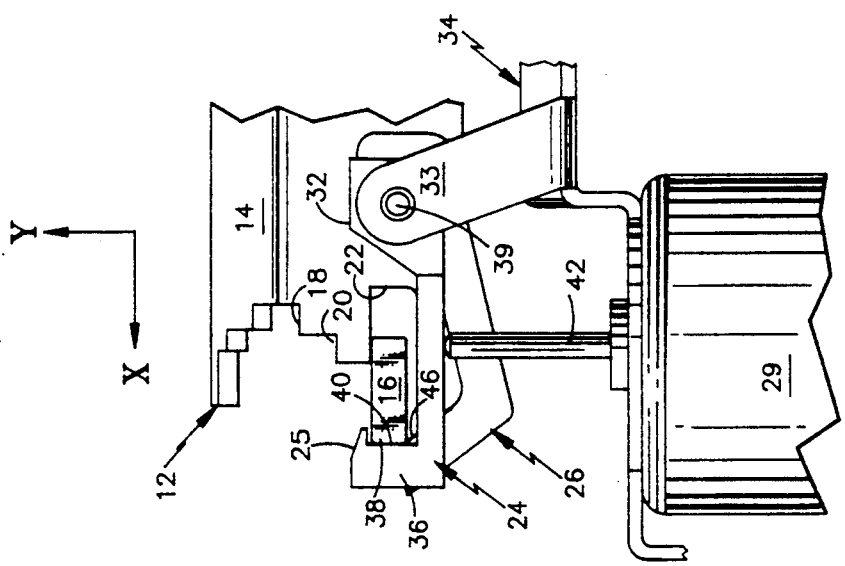
FIG. 2 is a view similar to FIG. 1A with the brake/shift interlock in a "locked" position latching the shift lever in the park mode.

The spring lever 26 has a ramp or cam surface 46 positioned for camming engagement with bar 16 during withdrawal of bar 16 from the park mode cutout 22. As explained hereafter, if the solenoid is de-energized, the camming engagement of the bar 16 with the cam surface 46 during withdrawal of the bar 16 from the park position will drive the spring lever 26 and latch 24 to pivot counterclockwise (as viewed in FIGS. 1A-3) to the unlocked position of FIG. 3. If the solenoid is energized, the camming engagement of the bar 16 with the cam surface 46 during withdrawal of the bar 16 will cause the spring lever 26 to flex counterclockwise with the latch 24 remaining in position (FIG. 2) as held by the actuator rod 42. As seen in FIG. 2, the spring lever 26 has been flexed counterclockwise by the camming action of the bar 16 and the latch 24 has been held in the locking position to catch and lock the bar 16.

The spring lever 26 has a predetermined spring rate beyond which, in the configuration of FIGS. 1-3, the lever will flex or bend. The spring rate of spring lever 26 is predetermined relative to the biasing force of bias spring 44 so that spring lever 26 can be driven by bar 16 to rotate and overcome the biasing force of spring 44 without substantially bending or flexing to forcibly retract actuator rod 42 into the solenoid 28 when the solenoid is deenergized. The spring rate of spring lever 26 is not sufficient however to overcome the magnetic holding power of solenoid 28 when energized. Therefore, the spring lever will flex or bend counterclockwise about the coupling connection to latch 24 responsive to camming engagement with bar 16 when solenoid 28 is energized so that latch 24 remains in the locking position to catch and lock the bar 16 in the park mode cutout 22. In the illustrated embodiment, the spring lever 26 is plastic and the latch 24 is steel.

Figure 4:
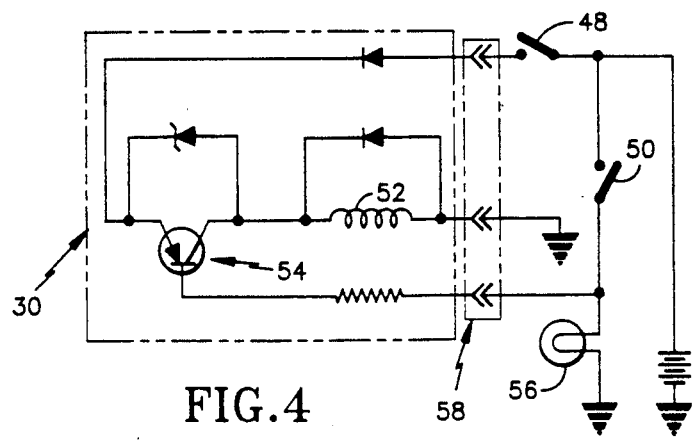
FIG. 4 is a schematic diagram of the solenoid control circuit.

The solenoid control circuit 30 is configured to control the energization of the solenoid as required and electrically isolate the solenoid from other vehicle systems. Referring to FIG. 4, the circuit 30 is configured to energize the solenoid 28 only when the ignition switch 48 is closed and the brake switch 50 is open. With the ignition switch closed and the brake switch open, battery voltage is applied through the ignition switch 48 to the transistor switch 54 so that current flows through the solenoid coil 52 to ground to energize the solenoid. The base of the transistor switch 54 is at ground potential through the brake lamps 56. When the normally open brake switch 50 is closed, the base is no longer at ground potential and the transistor switch 54 shuts off so that the solenoid coil 52 is no longer energized. The circuit 30 is mounted within the lower end of the housing 29. The circuit 30 connects to the ignition switch circuit and brake switch circuit via a three pin connector 58 accessible in the connector receptacle 37 at the lower end of the housing 29.

In assembly, the brake/shift interlock is particularly compact for space-efficient mounting on the steering column adjacent the detent mechanism 12. In the illustrated embodiment, the brake/shift interlock has an axial length of approximately 78 mm from the end cap 35 to the pivot axis 39. The width of housing 29 is approximately 30 mm and the length of latch 24 is approximately 35 mm. As seen in FIG. 1, the brake/shift interlock assembly mounts conveniently to the steering column in a space-efficient manner.

In operation, the brake/shift interlock has three basic operational positions as exemplified in the drawings, that is, a normal at rest ready or locking position (FIG. 1A), a locked position (FIG. 2) and an unlocked position (FIG. 3).

In the ready position, the return spring 44 biases the actuator rod 42 in the extended position and thereby biases the latch 24 and spring lever 26 in the locking position. In the locking position, the latch 24 is positioned to engage and lock the bar 16 upon the occurrence of specific conditions, i.e., the shift lever is in the park mode, the ignition switch is on, and there is an attempt to change the transmission mode without depressing the brake pedal. The locking position is the normal position of the latch and spring lever regardless of the position of the ignition switch, the transmission lever, or the brake pedal (except during the transition of withdrawal or insertion of the bar 16 in the cutout 22). Although bar 16 is shown in the park transmission mode in FIG. 1A, it is understood that it may be located in any other transmission mode cutout, as for example cutout 18 or cutout 20, and the latch 24 and spring lever 26 would be in the locking position.

In this normal position, when the bar 16 is in the park position, the cutout portion 40 of latch 24 is positioned adjacent the exterior end 38 of bar 16. If the solenoid is energized, any attempt to move the transmission selector lever out of park will be prevented by the bar 16 being stopped in the cutout 40 of the latch 24 (FIG. 2). If the solenoid is de-energized, the withdrawal of the bar 16 from the park mode cutout 22 will pivot the latch 24 counterclockwise as seen in FIG. 3 to the unlocked position so as to allow the bar to be moved to another transmission mode position.

In the locked position as shown in FIG. 2, the latch 24 is in engagement with the bar 16 to prevent further withdrawal movement of the bar 16 in an attempt to change the transmission mode. When the ignition switch 48 is in the closed position, the solenoid 28 is energized unless the brake pedal is depressed to close the normally open brake switch 50. If the driver attempts to perform a shift without depressing the brake pedal, the bar 16 begins to move outwardly in the X direction engaging the cam surface 46 of the spring lever 24. Because the solenoid holding force applied to the latch is stronger than the spring force of the spring lever 26, the spring lever flexes counterclockwise under the driving force of the bar 16 acting on its cam surface 46. The energized solenoid 28 holds the latch 24 in its locking position to engage the bar 16 and prevent further withdrawal from the park mode cutout 22 so that the transmission remains in the park mode.

In the unlocked position of FIG. 3, the latch 24 and spring lever 26 have been pivoted to the unlocked position to permit withdrawal or insertion of the bar 16 relative to the park mode cutout 22. If the solenoid is not energized, the transmission may be shifted from the park mode. The solenoid 28 may be de-energized because the ignition switch is in the off position or, if the ignition switch is in the run position, the driver has depressed the brake pedal to close the brake switch. In either event, when the driver moves the shift lever out of the park position, the bar 16 moves in the X direction to engage the cam surface 46 of the spring lever. Because the spring force of the spring lever 26 is greater than the biasing force of the return spring 44, the camming action of the bar 16 on the spring lever 26 will rotate both the spring lever 26 and the latch 24 into the unlocked position to allow the bar 16 to fully disengage the park mode cutout 22. Once the driver shifts from the park position to another transmission mode, the latch and spring lever will return to the normal position of FIG. 1A under the biasing force of the return spring 44.

In shifting to the park position when the solenoid is de-energized, the bar 16 will engage the upper cam surface 27 of spring lever 26 to rotate the latch and spring lever out of the way (as shown in FIG. 3) with only a negligible amount of force required at the shift lever 13. When the solenoid 28 is energized, it is possible to shift to the park position because the mechanical advantage of the shift lever 13 allows the holding force of the solenoid to be overcome with only a reasonable amount of force on the shift lever 13. In shifting to the park position with the solenoid energized, the bar 16 will engage the beveled upper surface 25 of latch 24 to pivot the latch to the unlocked position against the holding force of the solenoid 28.

As can be seen, a brake/shift interlock has been described which prevents "sudden acceleration" when shifting out of the park mode and which does not generate undesirable actuation noise in operation. Notably, the actuator rod is biased to the extended position so that energizing and deenergizing of the solenoid does not produce movement of the actuator rod so there is no actuating movement and no undesirable actuating noise. Moreover, the brake/shift interlock is particularly advantageous with the column mounted shift control mechanism. It is substantially self-contained and compact so as to be easily mounted on the steering column adjacent the shift control mechanism.

As will be apparent to persons skilled in the art, various modifications and adaptations of the structure above described will become readily apparent without departure from the spirit and scope of the invention, the scope of which is defined in the appended claims.

What is claimed is:

1. A brake/shift interlock assembly for a vehicle transmission shift control mechanism of the type having a shift lever for selection of transmission modes including a "park" mode and an interconnected detent member operationally engageable with a cooperating detent plate at a plurality of operating positions corresponding to shift lever position including a "park" mode position for retaining the shift lever in selected transmission mode positions comprising latch means for locking the detent member and interconnected shift lever in the park position, said latch means being movably mounted for movement between a locking position for locking the detent member in the park position and an unlock position allowing withdrawal of the detent member from the park position, electromagnetic actuator means for maintaining the latch means in said locking position, said actuator means being selectively energized and having a actuator rod moveable between first and second positions, said first position being an energized position and said second position being a deenergized position, said rod being connected to said latch means so as to position said latch means in said locking position when said rod is in said first position, biasing means for normally biasing said rod to said first position to normally bias said latch means in said locking position, electrical circuit means for interconnection to an automobile circuit for selective energization of said actuator means to hold said rod in said first position to hold said latch means in said locking position, and means responsive to withdrawing the detent member from the park position for moving said latch means to the unlock position when said actuator means is de-energized.

2. The assembly of claim 1 wherein said circuit means is configured for interconnection to an ignition switch circuit and a brake switch circuit for energizing said actuator means when said ignition switch is closed and said brake switch is open.

3. The assembly of claim 1 wherein said means for moving said latch means comprises lever means for driving said latch means toward the unlock position to overcome said biasing means, said lever means being actuated by said detent member so as to drive said latch means responsive to withdrawing the detent member from the park position.

4. The assembly of claim 1 wherein said latch means comprises a latch member having a catch portion configured to engage and latch said detent member, said latch member being mounted for pivotal movement between a first locking position and a second unlock position such that said catch portion is positioned adjacent the detent member in the park position to prevent withdrawal of said detent member from the park position when said latch member is in said locking position and said catch portion is positioned remote from said detent member in the park position to permit withdrawal of said detent member from the park position when said latch member is in said unlock position, and said actuator rod is connected to said latch member to position said latch member in said locking position when said rod is in said first position.

5. The assembly of claim 4 wherein said means for moving said latch means comprises a spring lever pivotally mounted and coupled to said latch member for pivotal movement in unison between a first locking position and a second unlock position and cam means for pivoting said spring lever responsive to withdrawing movement of said detent member from the park position, said spring lever having a predetermined spring force such that: (a) said spring lever pivots said latch member responsive to said camming means when said actuator means is de-energized to overcome said biasing means and pivot the latch member to the unlock position and (b) said spring lever flexes responsive to said camming means when said actuator means is energized so that said latch member remains in said locking position to lock said detent member in the park position.

6. The assembly of claim 5 wherein said cam means comprises a cam surface disposed on said spring lever, said cam surface configured for camming engagement with said detent member upon withdrawing movement of said detent member from the park position with said spring lever in said first position.

7. The assembly of claim 5 wherein said shift control mechanism is a column mounted shift control mechanism, said detent member is a bar, and said detent plate is an insert plate having a plurality of slots configured to receive said bar, said slots corresponding to selectable transmission modes with one of said slots being a park mode slot, and said spring lever is configured for engagement with said bar during movement of said bar to said park mode slot from a slot other than said park mode slot so as to pivot said latch member out of said locking position when said actuator means is deenergized to allow insertion of said bar in said park mode slot.

8. The assembly of claim 7 wherein said latch member is configured for camming engagement with said bar during movement of said bar to said park mode slot from a slot other than said park mode slot so as to pivot said latch member out of said locking position when said actuator means is energized to allow insertion of said bar in said park mode slot.

9. The assembly of claim 5 wherein said spring lever is substantially resilient plastic material and said latch member is substantially metal, said spring lever and said latch member each having proximal ends and being coupled together at said proximal ends for pivotal movement in unison about a common pivot axis.

10. The assembly of claim 5 wherein said actuator means is a push-type solenoid having a plunger actuable between an extended position and a retracted position, said extended position being the energized position, and said plunger being connected to said actuator rod so that said actuator rod is in said first position when the plunger is in the extended position.

11. The assembly of claim 10 wherein said biasing means comprises a compression spring engaging said plunger to bias said plunger to the extended position.

12. The assembly of claim 1 wherein said actuator means is a push-type solenoid having a plunger actuable between an extended position and a retracted position, said extended position being the energized position, and said plunger being connected to said actuator rod so that said actuator rod is in said first position when the plunger is in the extended position.

13. The assembly of claim 12 wherein said biasing means comprises a compression spring engaging said plunger to bias said plunger to the extended position.

14. A brake/shift interlock assembly for a vehicle transmission shift control mechanism of the type having a shift lever for selection of transmission modes including a "park" mode and an interconnected detent member operationally engageable with a cooperating detent plate at a plurality of operating positions corresponding to shift lever position including a "park" mode position for retaining the shift lever in selected transmission mode positions comprising
  latch means for locking the detent member and interconnected shift lever in the park position, said latch means being movably mounted for movement between a locking position for locking the detent member in the park position and an unlock position allowing withdrawal of the detent member from the park position,
  electromagnetic actuator means for maintaining the latch means in said locking position, said actuator means being selectively energized and having a actuator rod moveable between first and second positions, said first position being an energized position and said second position being a deenergized position.
  said rod being connected to said latch means so as to position said latch means in said locking position when said rod is in said first position,
  biasing means for normally biasing said rod to said first position to normally bias said latch means in said locking position,
  electrical circuit means for selectively energizing said actuator means to hold said rod in said first position to hold said latch means in said locking position, and
  means responsive to withdrawing the detent member from the park position for moving said latch means to the unlock position when said actuator means is de-energized, said means for moving said latch means comprising lever means for driving said latch means toward the unlock position to overcome said biasing means, said lever means being actuated by said detent member so as to drive said latch means responsive to withdrawing the detent member from the park position, and
  said lever means comprising
  a spring lever having a cam surface configured for camming engagement with the detent member during withdrawal of said detent member from the park position, said spring lever being connected to said latch means so as to urge said latch means toward the unlock position responsive to camming engagement with said detent member, said spring lever having a spring force sufficient to overcome said biasing means to move said latch means to the unlock position responsive to camming engagement with said detent member when said actuator means is de-energized, said spring force being insufficient to move said latch means to the unlock position responsive to camming engagement with said detent member when said actuator means is energized.

15. A brake/shift interlock assembly for a vehicle transmission shift control mechanism of the type having a shift lever for selection of transmission modes including a "park" mode and an interconnected detent member operationally engageable with a cooperating detent plate at a plurality of operating positions corresponding to shift lever position including a "park" mode position for retaining the shift lever in selected transmission mode positions comprising
  latch means for selectively locking the detent member in the park position, said latch means having a locking position for locking the detent member in the park position and an unlock position,
  an electromagnetic actuator means having an actuator rod moveable between a first energized position and a second de-energized position,
  said actuator rod in said first position being interconnected to said latch means so as to retain said latch means in said locking position,
  biasing means for normally biasing said actuator rod to said first energized position, and
  electrical circuit means for interconnection to an automobile circuit for selective energization of said actuator means.

16. The assembly of claim 15 wherein said actuator means comprises a push-type solenoid having a plunger actuable between an extend position and a retracted position, said extended position being the energized position, and said plunger being connected to said actuator rod so that said actuator rod is in said first position when the plunger is in the extended position.

17. The assembly of claim 16 wherein said biasing means comprises a compression spring engaging said plunger to bias said plunger to the extended position.

18. The assembly of claim 15 wherein said circuit means is configured for interconnection to an ignition switch circuit and a brake circuit for energizing said actuator means when said ignition switch is closed and the brake is actuated.

* * * * *